Jan. 29, 1952  F. A. GRUETJEN  2,583,836
SILO FILLER PIPE
Filed Dec. 5, 1946  3 Sheets-Sheet 1
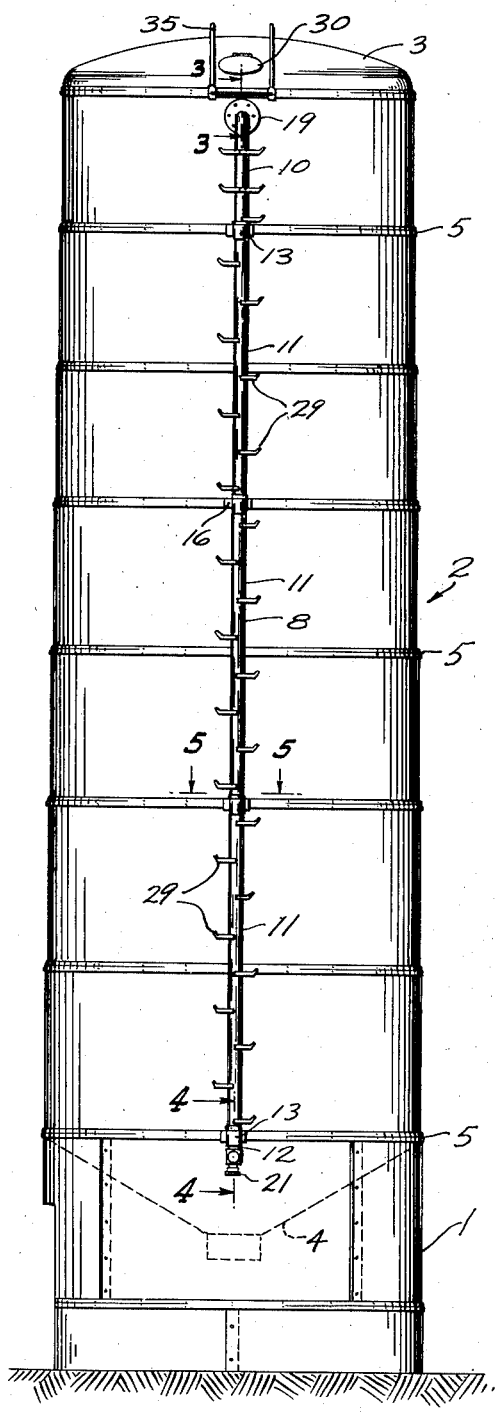
Fig. 1
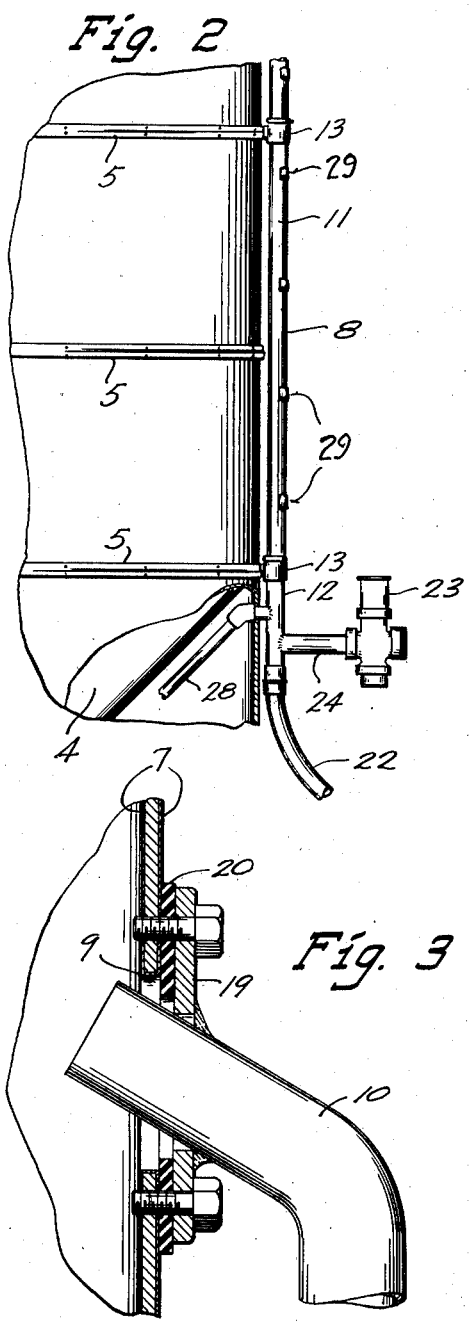
Fig. 2
Fig. 3
INVENTOR.
Frederick A. Gruetjen
BY
Attorney

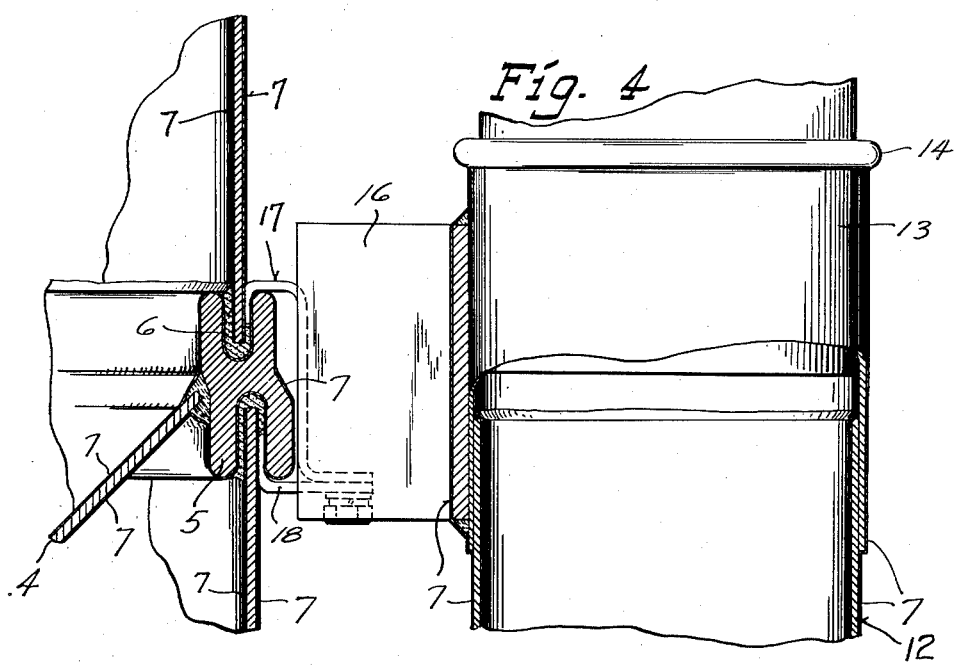
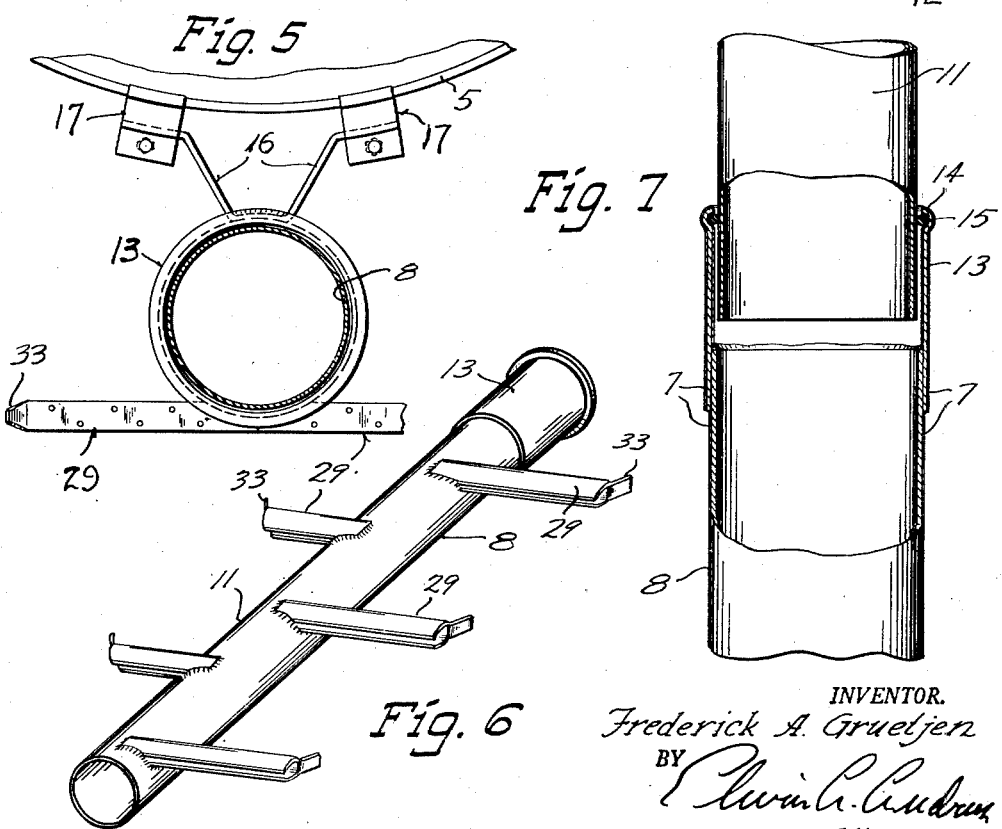

Jan. 29, 1952　　　　F. A. GRUETJEN　　　　2,583,836
SILO FILLER PIPE
Filed Dec. 5, 1946　　　　　　　　　　　　　3 Sheets-Sheet 3
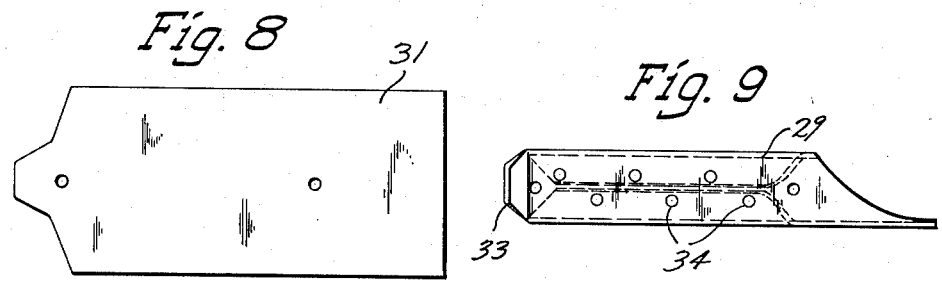
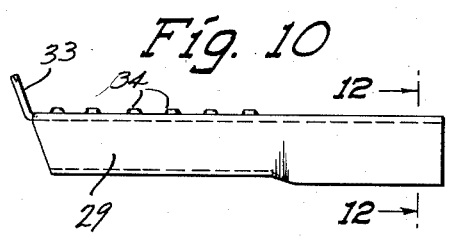
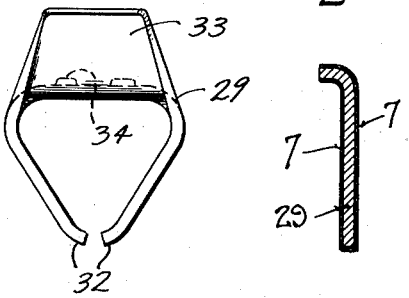
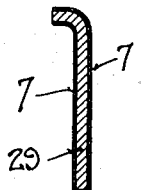
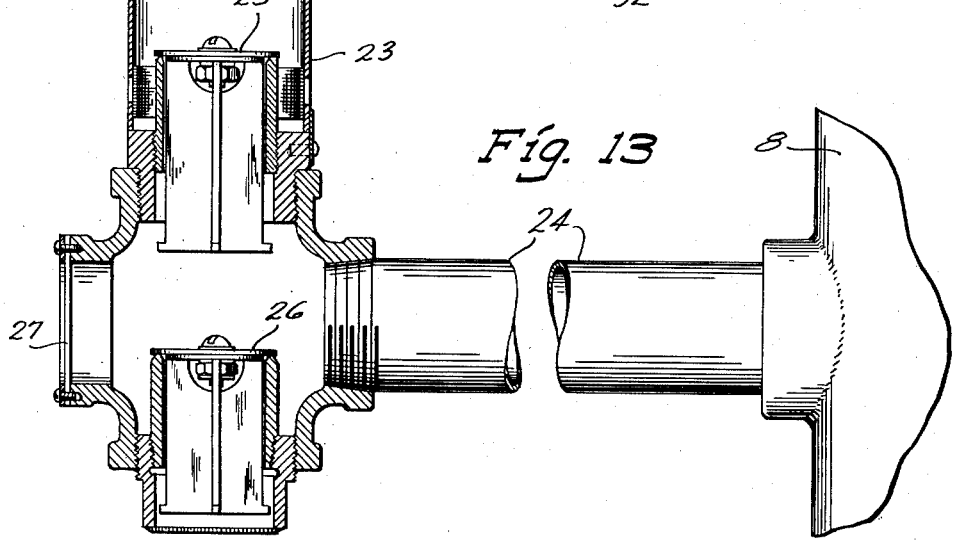
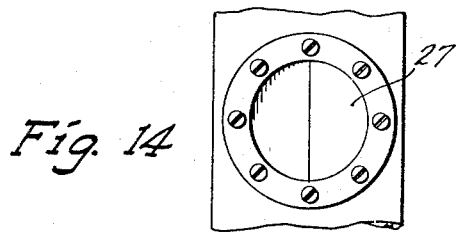
INVENTOR.
Frederick A. Gruetjen
BY
Attorney Patented Jan. 29, 1952

2,583,836

UNITED STATES PATENT OFFICE 2,583,836

SILO FILLER PIPE

Frederick A. Gruetjen, Milwaukee, Wis., assignor to A. O. Smith Corporation, Milwaukee, Wis., a corporation of New York Application December 5, 1946, Serial No. 714,246

2 Claims. (Cl. 189—3)

1

This invention relates to a silo filler pipe and particularly relates to a filler pipe of a silo disposed as a ladder and gas conduit to balance the pressure within the silo with the pressure outside the silo and to conduct oxygen-free gas into the silo to replace the volume of silage removed.

The invention is particularly applicable to a ceramic enamel coated steel silo such as that described and claimed in the co-pending application of Wesley G. Martin entitled "Silo," Serial No. 598,044 filed June 7, 1945, now Patent No. 2,551,216, issued May 1, 1951, and assigned to the assignee of the present application.

One object of the invention is to provide a low cost ladder which in service will be strong and durable.

Another object of the invention is to provide a ladder which is easily erected and secured to the silo.

A further object of the invention is to provide the filler pipe of a silo as a ladder and a valve controlled conduit for ingress and egress of gases to maintain the inside of the silo at atmospheric pressure.

Another object is to provide the filler pipe of a silo as a ladder thereby decreasing erection costs and the structure required on the outside of the silo wall.

Another object of the invention is to provide a ceramic enamel coated filler pipe with a silo formed of metal sections which are similarly coated.

Another object of the invention is to provide an enamel coated silo filler pipe formed of sections which are supported only at the upper end within the silo joint leaving the lower ends free to expand and contract to prevent crazing of the enamel on the pipe by distortion.

Another object is to provide a ceramic enamel coated pipe which is provided with reinforced joints to secure the pipe to the silo to prevent injury to the enamel on the body portions of the pipe by deflection.

A further object is to provide a ceramic enamel coated filler pipe which is readily shipped and erected.

A further object is to provide a silo filler pipe with joints that permit expansion and contraction and maintain the pipe airtight.

Other objects and advantages of the invention will appear hereinafter in connection with the following description of an embodiment of the invention as illustrated in the accompanying drawings.

Figure 1 is an elevational view of a silo with the filler pipe in place;

2

Fig. 2 is an enlarged side elevational view of a portion of the silo showing the filler pipe secured in place;

Fig. 3 is an enlarged detail section taken on line 3—3 of Figure 1 showing the upper end of the pipe entering the silo;

Fig. 4 is a detail section taken on line 4—4 of Fig. 1;

Fig. 5 is a section taken on line 5—5 of Fig. 1;

Fig. 6 is a perspective view of one of the sections making up the filler pipe;

Fig. 7 is a detail sectional view of the joint between sections;

Fig. 8 is a top plan view of a blank from which a rung is fabricated;

Fig. 9 is a top elevational view of a ladder rung;

Fig. 10 is a side elevational view of a ladder rung;

Fig. 11 is an end elevational view of a ladder rung;

Fig. 12 is a cross-sectional view taken on line 12—12 of Fig. 10;

Fig. 13 is an enlarged detail section of the safety pressure means on the lower end of the filler pipe; and Fig. 14 is an end view of Fig. 13 showing the diaphragm of the safety pressure means.

The silo with which the invention is shown as employed comprises a foundation 1 and a shell section 2 which is supported on the foundation and constructed of a plurality of ring members assembled one on top of the other. Shell section 2 is closed at the top by the cover 3 and at the bottom by a cone 4 and the joints between the shell sections are sealed by a ring member, such as the H-shaped rings 5 to provide a substantially airtight structure for the storage of silage. Cement 6 may additionally be provided in the annular grooves of ring 5 to seal the joints. Foundation 1, shell section 2, cover 3, cone 4 and H-rings 5 are coated with ceramic enamel 7 to protect the metal from corrosion.

The silo is filled with the fodder that provides the silage by a filling apparatus, not shown, through the filler pipe 8 which extends upwardly from substantially the bottom of the silo along the outside of the silo wall to project into the silo through sealed opening 9 in the uppermost shell section 2.

Pipe 8 is formed from a plurality of cylindrical metal sections comprising the upper section 10, the intermediate sections 11 and the generally short bottom section 12.

The sleeves 13 are welded to the upper end of the bottom pipe section 12, and each of the intermediate sections 11. Sleeves 13 are of greater diameter than the pipe sections and each sleeve projects from the section to which it is secured to receive the lower end of the next adjacent pipe section providing a slip joint connection therewith.

The annular bead 14 is provided near the upper end of each sleeve 13 within which is seated the gasket 15. When the lower end of a pipe section is inserted within sleeve 13 to join two adjacent sections together, gasket 15 is compressed between the sleeve and pipe section to seal the joint against infiltration of air into the filler pipe.

The lower end of the pipe section 10 and sections 11 due to the slip joint connection described is free to expand and contract within the respective sleeve in which it is retained so that the pipe will not become distorted due to severe temperature changes and will remain sealed against entry of air.

The sleeves 13 and all of the pipe sections are coated with the ceramic enamel 7 the same as the other silo parts to protect the same from corrosion.

In order to prevent crazing of the enamel of the pipe sections by stresses to which the same will be subjected in service as will be described, the filler pipe 8 is secured to the silo by vertically spaced brackets 16 which are welded to the sleeves 13. Sleeves 13 reinforce the joint between pipe sections and form a solid connection for the pipe to H-rings 5 at spaced intervals without deflection in service.

The arms of brackets 16 extend from the body portion thereof which is welded to a sleeve 13, and each arm has a flange 17 which engages the H-ring in the upper annular groove thereof complementary to the flanged clips 18 which are secured to the bottom of each arm of bracket 16 and engage the H-ring in the lower annular groove. The construction of brackets 16 and the securing of pipe 8 to the H-rings 5 is described and claimed in the co-pending application of the present inventor entitled "Silo Accessories" filed on even date herewith, Serial No. 714,244, now abandoned, and assigned to the same assignee as the present invention.

The upper end portion of upper pipe section 10 which curves inwardly to project within the silo through uppermost shell section 2 is welded to plate 19 and the plate is secured to the silo shell by cap screws or the like to secure pipe section 10 in place. A gasket 20 is located between the plate and silo shell section to seal the joint against passage of air.

The sump 21 is threaded into the lower end of pipe 8 to seal the bottom end when the pipe is not in use for filling the silo and to catch condensate for removal.

Sump 21 is removed when the silo is being filled and a conduit such as the conduit 22 from a filling apparatus, not shown, is connected to the lower end of pipe 8 by any suitable means such as is illustrated in Fig. 2 to convey fodder into the silo through the pipe.

The pressure relief means 23 is secured to filler pipe 8 near the bottom end thereof to provide for inlet and outlet of gases through pipe 8 to maintain a balance between the pressure inside and outside the silo.

Pressure relief means 23 may be constructed in a number of different ways. In the drawings a short pipe 24 connects pressure relief means 23 to filler pipe 8. In one chamber of means 23 the confined gases unseat valve 25 to escape from the silo and in an opposite chamber air seeking to flow into the silo unseats valve 26 to flow into the silo through pipes 24 and 8. In addition pressure relief means 23 is provided with a slit diaphragm 27 of rubber or the like which operates to permit flow of gases into and out of the silo in the event valves 25 or 26 fail to unseat in service.

The silage is removed from the bottom of the silo by apparatus operated by a gasoline engine or the like, not shown.

Filler pipe 8 is also employed to convey the combustion gases of the gasoline engine, if one is employed, or other oxygen-free gases to the inside of the silo to prevent deterioration of the silage by oxygen within the silo. As shown in Fig. 2 the gas conducting pipe 28 is secured to pipe 8 near the lower end thereof and extends through foundation 1 and beneath cone 4 to connect filler pipe 8 to a gasoline engine or other source of oxygen-free gas, not shown. The oxygen-free gases are conveyed to the inside of the silo in at least sufficient volume to replace the volume of silage removed. The employment of oxygen-free gases, as described, is set forth and claimed in the co-pending application of Wesley G. Martin entitled "Silo," previously referred to herein.

Filler pipe 8 is provided with a plurality of right and left rungs or steps 29 which are suitably vertically spaced to provide pipe 8 as a ladder to enable the operator to reach the top of the silo, for example, to inspect the silage through the sealed opening 30 in cover 3.

Rungs 29 are stamped from the sheet metal blank 31 shown in Fig. 8. Each rung 29 is shaped from blank 31 to provide the inner end of the rung flat for securing the same flush to pipe 8 such as by welding. The body of each rung is hollow with the rung formed from blank 31 to a generally U-shape with the longitudinal edges 32 spaced from each other at the bottom and the top of the rung presenting a substantially flat footing surface.

The outer end of the rung has an upwardly projecting flange 33 to confine the foot on the rung and nipples 34 may be provided on the upper surface of each rung for better footing. Other types of rungs may be employed with pipe 8 if constructed to be employed without injuring the enamel on pipe 8. The rungs are also coated with enamel 7 to protect them from corrosion.

The guard assembly 35 is suitably secured at the top of the silo to protect the operator as he climbs over the top of the silo from filler pipe 8. The guard assembly and structure to secure the same in place is described and claimed in the co-pending application of the present inventor above referred to entitled "Silo Accessories."

In the erection of the silo the cover 3 is first assembled with the uppermost ring of shell section 2 by means of rings 5. Thereafter the guard assembly 35 is bolted to the top of cover 3 and clamped to the uppermost H-ring 5 as is described and claimed in the co-pending application of the present inventor entitled "Silo Accessories."

The top section 10 of pipe 8 is next secured in place by inserting the upper or discharge end through the opening 9 provided in the ring of shell section 2 immediately below cover 3 and securing plate 19 on the pipe to the shell section around opening 9 by screws or the like which are threaded into place in holes provided for that purpose. The gasket 20 is interposed between the shell section and plate 19 to seal the joint.

The next intermediate ring of shell section 2 is raised and secured by an H-ring 5 to the shell section immediately beneath cover 3 which is then followed by securing the next intermediate ring in place.

After the two uppermost intermediate rings of shell 2 are in place the upper intermediate section 11 of pipe 8 is then assembled in place by first inserting the lower free end of upper pipe section 10 within sleeve 13 of section 11. Gasket 15 is compressed within bead 14 upon insertion of section 11 within the sleeve to provide a fluid tight seal of the joint. Section 11 is then secured to the H-ring 5 which is second from the top of the silo, by clamping bracket 16 on sleeve 13 to the H-ring as previously described.

The assembly of the silo sections and filler pipe 8 then continues in the same manner as the silo is erected from the top down by first securing the rings of shell 2 together by their respective H-rings and then clamping the pipe sections to the H-rings which as shown in the drawings is preferably every other H-ring. The three intermediate pipe sections thus extend the length of two of the rings of shell 2.

In the final assembly of the silo, the entire shell 2 of the silo with pipe 8 in place is lifted, with suitable apparatus not shown, into the H-ring 5 which is welded to the cone 4 supported on the foundation 1.

The invention provides a single pipe structure on the outside of the silo which is disposed as a filler pipe for carrying fodder into the silo, as an oxygen-free gas conduit, as a breather conduit to maintain atmospheric pressure in the silo, and as a ladder to gain access to the top of the silo.

The employment of a single pipe structure as described simplifies erection and maintenance and decreases costs of manufacture and design. The ceramic enamel employed to coat the pipe inside and out protects it from corrosion in service.

By securing the brackets 16 to the reinforcing sleeve members at the pipe joints rather than to the wall of the pipe sections, the main stress on the pipe is taken by the sleeves when the pipe is used as a ladder and injury to the unreinforced and generally thin wall of the pipe sections by deflection is prevented.

The filler pipe is also constructed to prevent distortion of the pipe and crazing of the enamel by leaving the lower end of each pipe section free to expand within a sealed joint under temperature changes and securing only the upper ends of each section to the H-rings of the silo.

Various embodiments of the invention may be employed within the scope of the accompanying claims.

I claim:

1. In an airtight silo formed of a plurality of superimposed metal ring members disposed in H-ring members at the joints therebetween, a silo filler pipe formed of a plurality of ceramic enamel coated sections and extending up the outside of the silo and opening into the silo near the top thereof, generally short cylindrical sleeve members provided at the joints between pipe sections and secured to the upper end of the lower pipe section to be joined and forming a slip joint connection with the upper pipe leaving the latter free to expand to prevent deflection of the metal and crazing of the enamel coating thereon, and arms connected to said sleeve members and extending laterally therefrom with flanges thereon hooked over said H-rings to connect the pipe thereto without deflection of the body of the pipe and injury to the enamel coating thereof.

2. A filler pipe in combination with a substantially airtight silo formed of a plurality of generally cylindrical sections coated with ceramic enamel to protect them from corrosion and joined at their joints by similarly coated ring members, said filler pipe comprising a plurality of ceramic enamel coated sheet metal tubular members extending vertically end to end on the outside of the silo, generally thick sleeve members secured to the upper end of each tubular member and receiving therein the lower end of the above adjacent tubular member with the lower ends of the tubular members free to float in said sleeve, the said sleeves constituting the joints between said tubular members, gasket means disposed in said sleeves to seal the joints between the tubular members without restriction of said tubular members, and means secured to said sleeve members and to the ring members to secure the tubular members to the silo without deflection of the metal of the tubular members and injury to the enamel coating thereon and on the silo sections and ring members.

FREDERICK A. GRUETJEN.

REFERENCES CITED

The following references are of record in the file of this patent:

UNITED STATES PATENTS

| Number | Name | Date |
|---|---|---|
| 144,690 | Miller | Nov. 18, 1873 |
| 188,234 | Copeland | Mar. 13, 1877 |
| 1,145,550 | Brown | July 6, 1915 |
| 1,265,442 | Fitch | May 7, 1918 |
| 1,466,292 | Bell | Aug. 28, 1923 |
| 1,496,585 | Mangrum et al. | June 3, 1924 |
| 1,842,298 | Smith | Jan. 19, 1932 |
| 1,869,021 | Perks | July 26, 1932 |
| 2,259,453 | Beyer et al. | Oct. 21, 1941 |
| 2,305,423 | Heuser | Dec. 15, 1942 |
| 2,318,576 | Arnold | May 11, 1943 |
| 2,353,029 | Graham | July 4, 1944 |
| 2,396,086 | Conaway | Mar. 5, 1946 |

FOREIGN PATENTS

| Number | Country | Date |
|---|---|---|
| 13,616 | Great Britain | 1893 |
| 15,564 | Great Britain | 1892 |
| 861,491 | France | Feb. 10, 1941 |